July 25, 1967

O. W. SEPP 3,332,177

INFLATABLE STRUCTURES

Filed May 18, 1965

INVENTOR.
OSCAR W. SEPP

BY
M. R. Kestenbaum his ATTORNEY

July 25, 1967 O. W. SEPP 3,332,177
INFLATABLE STRUCTURES
Filed May 18, 1965 4 Sheets-Sheet 2

INVENTOR.
OSCAR W. SEPP
BY
*M. R. Kedenbaum* his ATTORNEY

July 25, 1967  O. W. SEPP  3,332,177
INFLATABLE STRUCTURES
Filed May 18, 1965  4 Sheets-Sheet 3

INVENTOR.
OSCAR W. SEPP
BY
M.R. Kestenbaum
his ATTORNEY

July 25, 1967     O. W. SEPP     3,332,177
INFLATABLE STRUCTURES

Filed May 18, 1965          4 Sheets-Sheet 4

INVENTOR.
OSCAR W. SEPP
BY
M. R. Kostenbauer
his ATTORNEY

United States Patent Office 3,332,177
Patented July 25, 1967

3,332,177
INFLATABLE STRUCTURES
Oscar W. Sepp, Merrick, N.Y., assignor to M. Steinthal & Company Inc., New York, N.Y., a corporation of New York
Filed May 18, 1965, Ser. No. 456,783
18 Claims. (Cl. 52—2)

This invention relates to inflatable structures and a method for producing such structures. More particularly, the invention is concerned with inflatable elongated substantially tubular members which assume arcuate shapes upon inflation without the need for additional restraining or bending elements. These tubular members can act as structural elements upon which other materials can be placed to form an enclosure or they can be assembled in a multi-member arrangement to form a structure comprising a continuous series of such members.

The invention is particularly useful for a portable enclosure which can be easily brought to a desired site and quickly erected. For example, a tent like enclosure suitable as a beach dressing room 6½ feet high with a hexagonal base 8 feet across, makes a package approximately 2 cubic feet when deflated.

Inflatable structures having arcuate shapes and methods of making them are known in the art. In one method described in the literature, two sheets of a thermoplastic material are placed on the bed of a heat sealer and one sheet is stretched relative to the other. The degree of stretch imparted to this one sheet depends upon the particular arcuate shape desired when the member is inflated. With one sheet held stretched, the sheets are peripherally sealed so as to form a tubular member when inflated. Fabrication in this manner is difficult due to the need to stretch one of the sheets and maintain it in the stretched condition during the sealing operation.

Moreover, the degree of stretch induced in the sealed-together sheets causes the tubular member to wrinkle up when deflated rendering it difficult to pack into a small compact package for easy transport.

Inflatable structures usually require anchoring means for fixing the structure on the ground. Certain known structures utilize a separate compartment filled with water or soil. While these may be satisfactory in certain circumstances, their success presupposes a ready supply of water or soil at the erection site. Otherwise it would be necessary to transport the ballast with the inflatable structure, again defeating an important advantage of the inflatable structure, i.e. the facility with which it can be erected, dismantled and transported from place to place.

It is, therefore, an object of the present invention to provide elongated substantially tubular inflatable members from a simplified method of fabrication.

It is another object of the present invention to provide improved elongated substantially tubular inflatable members which will automatically assume an arcuate shape when inflated.

It is a further object of the present invention to provide an improved inflatable structure using arcuate shaped tubular inflatable members as structural elements for supporting the material forming the walls and roof of the structure which is light and easy to pack into a relatively small package.

It is still another object of the present invention to provide an inflatable enclosure formed by a series of elongated inflatable substantially tubular members which assume arcuate shapes automatically upon inflation.

It is another object of the present invention to provide improved means for securing inflatable structures to the ground or any other support.

These and other objects of this invention are achieved by peripherally sealing together two sheets of stretchable substantially fluid impervious material which have different elastic characteristics. When the resulting enclosed cavity is filled with a gaseous fluid, the sheets will automatically form a substantially tubular member having an arcuate shape. By the term "elastic characteristics" it is meant that the sheets will stretch to different degrees under the same stress, either because the sheets are of different thicknesses of the same material, or because the sheets are of dissimilar materials having dissimilar expansion characteristics.

This substantially tubular member can be used as a structural element to which fabric or thermoplastic material can be attached to form an enclosure. Alternatively, an enclosure can be formed by a series of these substantially tubular inflatable members. Such an enclosure will automatically assume an arcuate shape when inflated.

Another feature of this invention is to provide extremely simple and effective means to anchor the inflatable members or structures to the ground or other support. In one embodiment, the inflatable member is provided with an elongated end portion through which a stake can be driven into the ground. In another embodiment the inflatable member is provided with several elongated anchor tabs having fastening means thereon. The anchor tabs pass through openings in a member fixed with respect to the ground and fasten to the member in an upwards orientation.

Other features and advantages of the invention will be readily apparent from the following description taken in connection with the accompanying drawings wherein.

Figure 1:
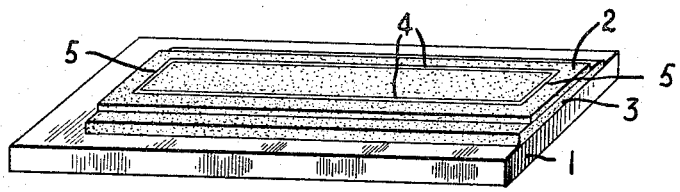
FIGURE 1 is an isometric view of a means for fabricating the structures in accordance with the invention.
Figure 3:
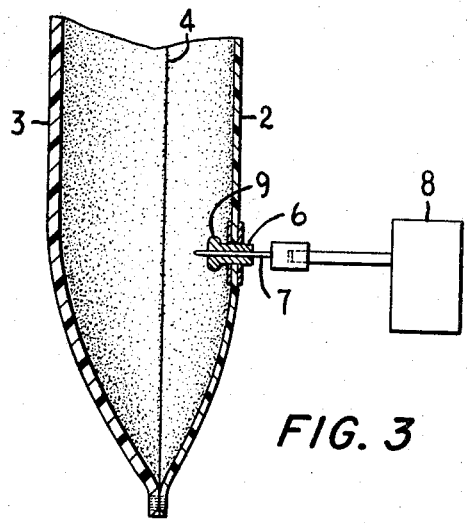
FIGURE 3 is a partial section of the inflatable structural member shown in FIGURE 2 taken at 3—3.

Referring now to the drawings in detail, FIGURE 1 shows two sheets 2, 3 of expandable material positioned upon the bed 1 of an electronic heat sealer in superposition with one another. The sheets 2, 3 may be of thermoplastic material or another material having a thermoplastic coating on at least one surface. The two sheets 2, 3 are in a relaxed (unstretched) condition and the top sheet 2 is of a smaller thickness than the bottom sheet 3. Pairs of continuous heat seals 4, 5 are made to effectively seal the sheets 2, 3 together to form an enclosure. The sealed-together sheets are then removed from the heat sealer and a conventional one-way air valve, such as football-type valve 6 is inserted into one of the sheets, for example the top sheet 2, as shown in FIGURE 3. When a gaseous fluid, such as air or carbon dioxide, is pumped from a pressurized fluid source 8 into the cavity between the two sheets 2, 3 through valve 6 it is clear that the cavity will expand as the pressure therein increases. Upon removal of the pin 7 from the valve 6 the increased pressure within the cavity forces element 9 of the valve to squeeze closed and thereby prevents the escape of the gaseous fluid from the cavity.

Figure 2:
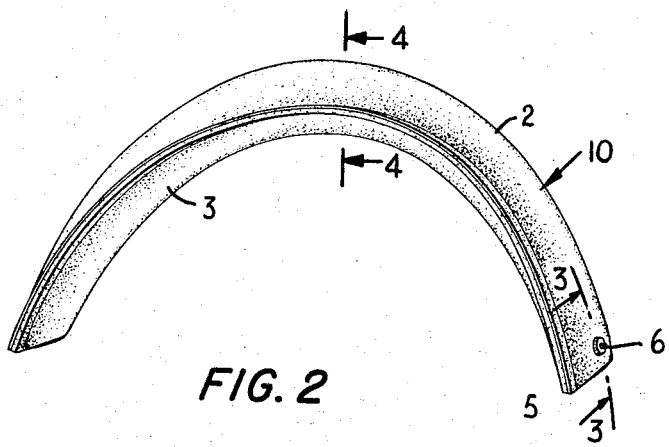
FIGURE 2 is an isometric view of a single inflatable member made in accordance with this invention in the inflated condition.
Figure 4:
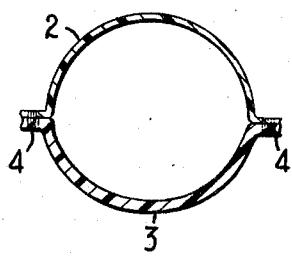
FIGURE 4 is a view of a section of the inflatable member shown in FIGURE 2 taken at 4—4.

Referring to FIGURE 2, upon inflation of the cavity, the sealed-together sheets will form an arcuate shaped substantially tubular member 10 having a cross-section as shown in FIGURE 4.

The arcuate shape results from the difference in expansion characteristics of the two sheets 2, 3 due to the difference in their thicknesses. It is to be noted that although the arcuate shape in the embodiment of the invention discussed hereinabove results from a construction using two sheets of different thicknesses of the same material, it is by way of example only since it is also contemplated that a structure having two sheets of the same thickness but of different expansion characteristics will also provide an arcuate shape and is within the scope of this invention.

It is well known that for a given material, the unit elongation or strain is proportional to the stress applied thereto. The coefficient by which the stress and strain are related is a measure of the elasticity of the material. For any given material, the larger the stress the larger the strain or unit elongation. Similarly, for a given stress, the unit elongation or strain varies directly with the elasticity of the material to which the stress is applied.

In a pressure vessel such as the elongated substantially tubular members of this invention, the longitudinal stress which is the stress on a transverse section perpendicular to the longitudinal axis of the member, is equal to the force in the direction of the longitudinal axis divided by the area of the section of the wall at the plane under consideration. It is also well known that the force acting in the direction of the longitudinal axis along any intersecting plane is equal to the area of the part of the plane included within the interior surface multiplied by the unit pressure of the fluid.

Since the top sheet of the tubular member has a smaller thickness than the bottom sheet the area of the cut section of the wall is smaller above the seal 4 than below the seal 4. Therefore, the force which acts at all points around the circumference, will produce a greater stress in the tubular member above the seal 4 than below. Since the elongation is proportional to the stress, the top sheet of the tubular member will expand along the longitudinal axis more than the bottom sheet. This is what causes the tubular member to assume its arcuate shape upon inflation.

Alternatively, if the top and bottom sheets are the same thickness but of different materials with different expansion characteristics, even though the force would produce equal stresses in both sheets, one sheet would expand more than the other. This also, would produce an arcuate shape upon inflation.

The degree of curvature that the inflated member will obtain can be controlled by various means. It is clear that the degree of curvature of a tubular member of particular dimensions will be different for different pressures. Also different relationships between the expansion characteristics of the two sheets will cause different degrees of curvature. In other words, for a top sheet of particular dimensions and a given pressure of the gaseous fluid within the member, the degree of curvature can be changed by changing the expansion characteristics of the bottom sheet.

Figure 5:
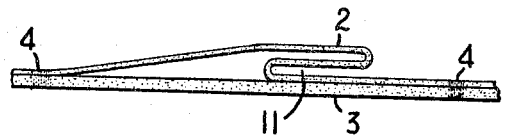
FIGURE 5 is cross-section showing a structure in accordance with this invention including a tuck in one sheet.
Figure 6:
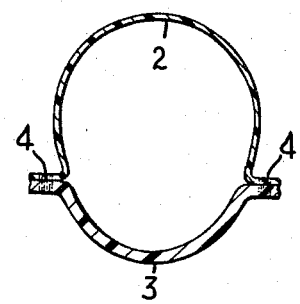
FIGURE 6 is a view of the cross-section shown in FIGURE 5 when in the inflated condition.

A further method to vary the curvature is to start with two sheets of unequal width. As shown in FIGURE 5, during the fabrication, top sheet 2 is again superpositioned upon bottom sheet 3. However, before the heat seals 4 are made, a tuck 11 is formed in the unstretched top sheet 2. When the resultant inflatable member is inflated, it will have a cross-section approximately as shown in FIGURE 6. This tubular member will have a greater degree of curvature than the tubular member of FIGURE 2 since the stiffer bottom sheet composes less of the cross-section than it does in the embodiment of FIGURE 2. Similarly, tubular members with a smaller degree of curvature than that shown in FIGURE 2 can be obtained by making the bottom sheet 3 wider than the top sheet 2, as in the manner described above.

Figure 7:
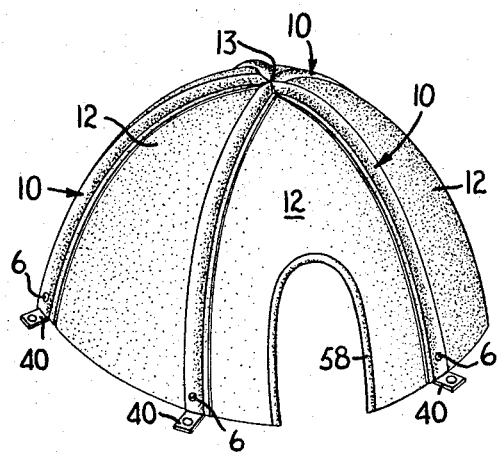
FIGURE 7 is an isometric view of a tent-like structure made in accordance with this invention.

FIGURE 7 shows a beach house embodying the invention. Support elements 10 have been constructed in accordance with the principles above, i.e. each one is made from two sheets 2, 3 of stretchable thermoplastic material of different expansion characteristics peripherally sealed to form an elongated substantially tubular member. Upon inflation each member automatically assumes an arcuate shape. Gores 12 of fabric or thermoplastic material are attached or sealed to the tubular members 10 which are themselves sealed or hinged together at the apex 13 of the beach house. An entrance 58 is formed in one of the gores 12.

Each tubular 10 is provided with an anchoring means designated generally by numeral 40. These means will be more completely described in connection with FIGURE 11.

Figure 8:
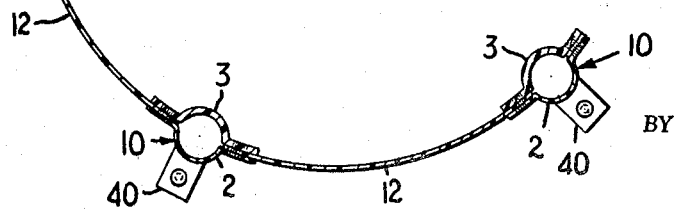
FIGURE 8 is a partial plan view of the tent-like structure of FIGURE 7.

FIGURE 8 shows a partial plan view of the structure shown in FIGURE 7. It shows more clearly, one preferred manner in which the gores 12 can be attached to the tubular members 10. During the initial fabrication of the tubular members 10, before the two sheets of thermoplastic material 2, 3 are sealed together, gores 12 are inserted therebetween as shown in FIGURE 8. If the gores 12 are of thermoplastic material, they and the two sheets 2, 3 of thermoplastic material can be sealed together in an single operation. If the gores 12 are not thermoplastic material, they can be provided with thin thermoplastic surfaces towards their edges.

Figure 9:
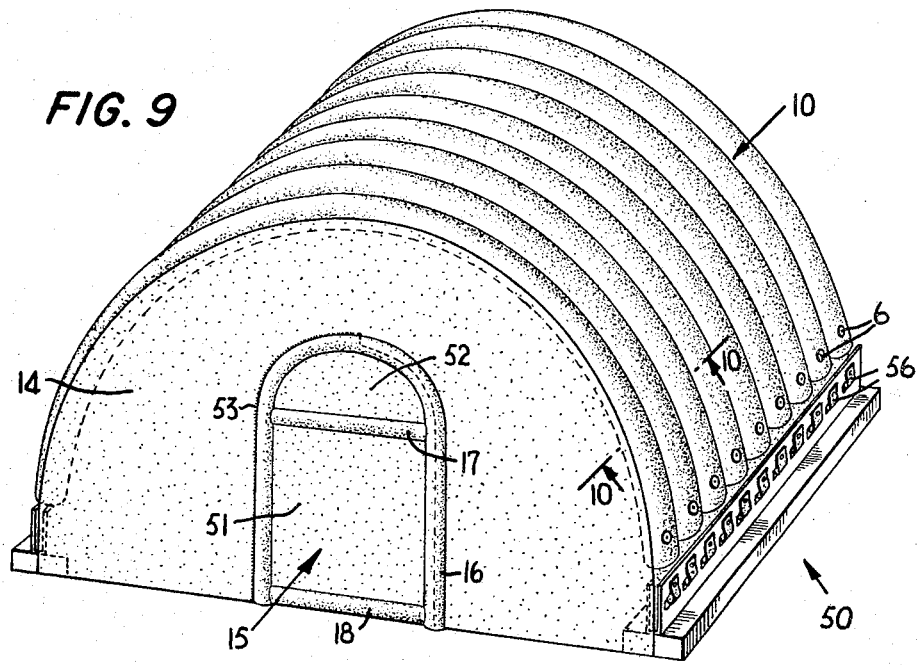
FIGURE 9 is an isometric view of a structure comprising a continuous series of structural tubes made in accordance with this invention.
Figure 10:
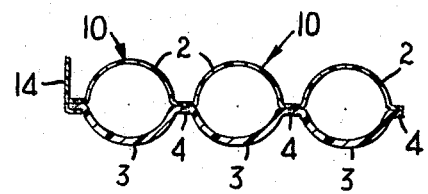
FIGURE 10 is a sectional view of a portion of the continuous series of structural tubes shown in FIGURE 9.

FIGURES 9 and 10 show a structure comprising a continuous series of structural tubes 10 made in accordance with this invention. The sides and roof of the structure are integral with one another and are fabricated by a single operation. Two sheets 2, 3 of stretchable thermoplastic material having different expansion characteristics are positioned one upon the other. A plurality of spaced parallel seals 4 are made in one direction to form a plurality of integral but individually inflatable elongated members. When transverse seals 5 are made and each member 10 inflated, the structure will automatically form the shape as shown in FIGURE 9. End panels 14 are provided at each end of the structure. For purposes of ingress and egress an entrance way, designated generally at 15 is provided. The entrance way comprises an inverted U-shaped inflatable tubular frame 16 with tubular members 17 and 18 positioned crosswise. The U-shaped frame 16 is partially affixed to the end panel 14 along the seal 53. Fabric or thermoplastic material panels 51, 52 are attached to the frame 16. To enter or leave the structure one merely pushes against the unaffixed portion of the U-shaped frame 16. The frame 16 will become partially distorted under this pressure. As soon as one has passed through the entrance way 15, frame 16 exerts a restoring force to its distorted portion and restores it to its original planar configuration.

The tubular members 10 are provided with an anchoring means designated generally by numeral 50. These means will be more completely described in connection with FIGURES 13A and 13B herein.

Figure 11:
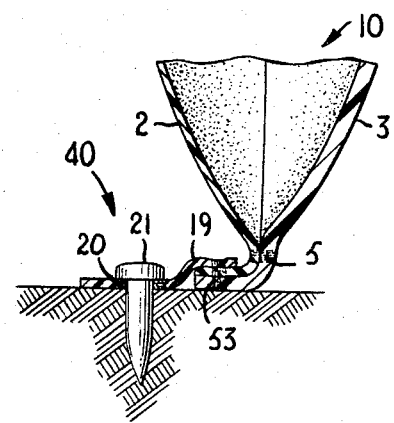
FIGURE 11 is a view of anchoring means for inflatable structures of the type shown in FIGURE 7.

Simple means for anchoring and securing inflatable structures is shown in FIGURE 11. Inflatable members 10 are provided with a tailpiece 19 which has an eyelet grommet 20 therein through which stake 21 can be driven into the ground. This anchor needs no great quantity of water or soil as do the prior securing means. It is as portable as the inflatable structure itself and in no way hinders the facility with which the structure can be transported. The tailpiece 19 can either be formed during the fabrication of the tubular member or can be attached by a heat seal 53 for example, afterwards.

Figure 12A:
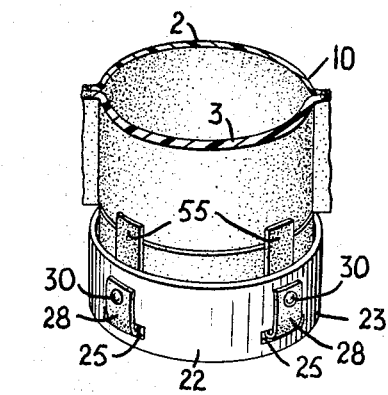
FIGURES 12A, 12B and 12C are views of another anchoring means for inflatable structures.
Figure 12B:
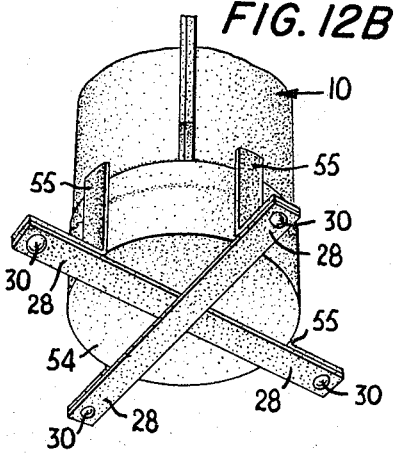
Figure 12C:
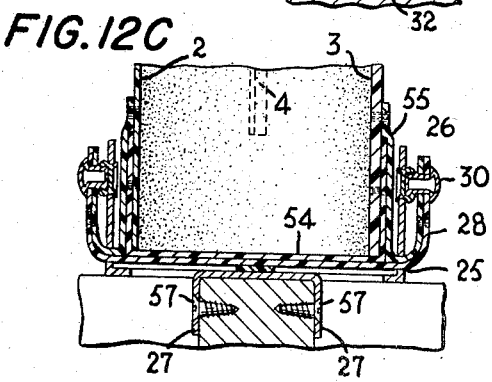

FIGURES 12A, 12B and 12C show another anchoring construction which is particularly advantageous for anchoring tubular members 10 which for design reasons retain a tubular cross-section at their ends. This tubular ending is fabricated by bonding a cylindrical cap end portion 54 to the tubular members 10 after the seals 4 have been made. Anchoring member 22 has a substantially cylindrical portion 23 integral with a flat base 24 to form an open vessel. The diameter of the substantially cylindrical portion is large enough to accommodate the end portion 54 of the tubular member 10 in the inflated condition. The cylindrical portion 23, or wall, of the vessel is provided with a plurality of slots 25 spaced along its periphery. There is also provided in the wall 23 of the vessel and spaced along its periphery, a plurality of holes 26 such that each hole 26 is directly above but spaced from a slot 25. Rigidly inserted in each hole is the female portion 29 of a snap fastener. The fastener is so positioned that the female portion 29 with which a male portion 30 of the fastener can mate is inserted through the hole and projects a distance from the outside surface of the wall 23. The female portion 29 extends from a flange which advantageously has a diameter larger than the diameter of the hole so that it can be firmly bonded to the inside surface of the vessel wall 23. Alternatively, the holes 26 can be eliminated completely by having the flange of the female portion 29 of the snap fastener bonded directly to the outside surface of the vessel wall 23.

Tabs 27 depend from flat plate 24 and are suitable for straddling a railing or fence to which the tabs are fastened by suitable fastening means screws 57.

The end portion of tubular member 10 is provided with a plurality of straps 28. The straps are placed one upon the other to form a cross and are sealed to the end 54 of the tubular member so that when tubular member 10 is inflated, the straps 28 are tensioned and restrict the end portion of tubular member 10 to a substantially right cylindrical shape as shown in FIGURES 12A, 12B and 12C.

A second plurality of straps 55 are sealed along a portion of their lengths to straps 28 and along the remaining portion of their length to the sides of the end portion 54.

Straps 28, 55 can be attached to the tubular member 10 either during its original fabrication or thereafter. The unattached ends of each strap 28, 55 are provided with the male portion 30 of a snap fastener which can be mated with the female portion 29 of the snap fastener inserted in each hole 26.

The anchorage is accomplished by first affixing the anchoring member 22 to a fence or railing by means of tabs 27 and screws 57. Then the end portion 54 of inflatable member 10 is placed, while in the deflated condition, into the anchoring member 22 so that the straps 28, 55 lay in a radial direction. The straps are then inserted through the slots 25 from the inside of the anchoring member 22 and pulled up so that the male 30 and female 29 portions of the snap fastener are mated. The tubular member is then ready for inflation.

If the inflatable structure is to be permanently installed at a given location, the end portion of tubular member 10 can be physically cemented to the anchoring member 22.

Figure 13A:
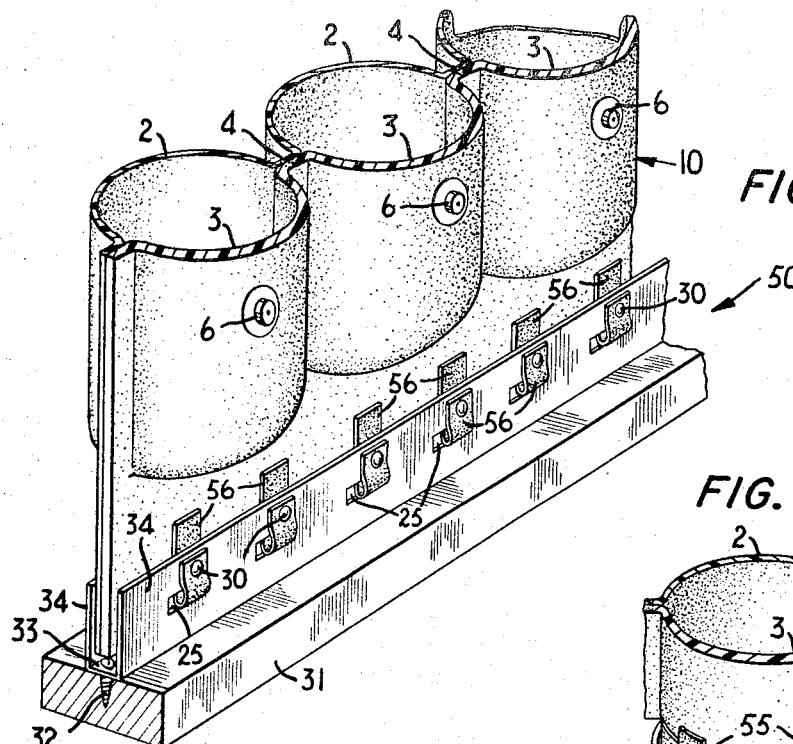
FIGURES 13A and 13B are views of an alternative anchoring means for inflatable structures of the type shown in FIGURE 9.
Figure 13B:
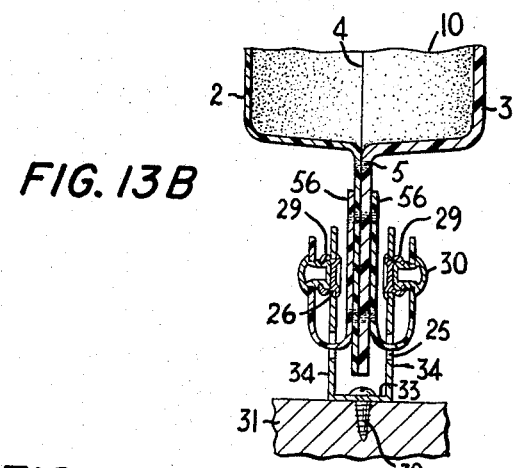

An alternative anchoring arrangement is shown in FIGURES 13A and 13B. In this embodiment, the end portion of the tubular member 10 is provided with a plurality of straps 56 sealed along a portion of their length to tubular member 10. The unattached ends of each strap 56 are provided with one mateable part 30 of a snap fastener as described in connection with FIGURE 12C.

In this embodiment, the anchoring member 50 comprises a plank-like member 31 rigidly fastened thereto by means of suitable fastening means 32, a U-shaped channel member having a substantially flat piece 33 and two leg pieces 34 at substantially right angles thereto. The leg pieces 34 are each provided with a plurality of slots 25 and the cooperating mateable parts 29 of a snap fastener similar to the slots snap fasteners described in connection with FIGURE 12C.

The anchorage is accomplished in substantially the same manner as described in connection with FIGURE 12C, i.e. the straps 56 are inserted through slots 25 and pulled up to a position where the two mateable parts 29, 30 of the snap fastener can be mated.

Plank 31 can be attached to the ground by means of stakes or the like, not shown, or can be made to have sufficient weight that there would be no need to attach it to the ground.

It is to be noted that in the embodiments of FIGURES 12 and 13 the female portion 29 of the snap fasteners are shown as being attached to the anchoring member and the male portion 30 as being attached to the strap. Their positions can be reversed without departing from the scope of this invention.

Various other modifications and extensions of this invention will become apparent to those skilled in the art. All such variations and deviations which basically rely on the teachings through which this invention has advanced the art are properly considered within the spirit and scope of the invention.

What is claimed is:

1. A method of fabricating an arcuate shaped inflatable member comprising the steps of superpositioning upon a first sheet of stretchable substantiantially fluid impervious material having first elastic characteristics a second sheet of stretchable substantially fluid impervious material having second elastic characteristics different from said first elastic characteristics sufficient to induce an arcuate shape in said member upon inflation thereof and maintaining the same degree of stretch in said first and second sheets while sealing said sheets to each other by a plurality of seals, said seals defining a closed perimeter.

2. A method of making an arcuate shaped inflatable member comprising the steps of superpositioning upon a first sheet of stretchable thermoplastic material of a first thickness a second sheet of stretchable thermoplastic material of a second thickness different from said first thickness sufficient to induce an arcuate shape in said member upon inflation thereof and maintaining said first sheet and said second sheet in an unstretched condition while forming a plurality of seals joining said sheets such that said seals define a closed perimeter.

3. A method of fabricating an inflatable member in accordance with claim 1 wherein sealing of said closed perimeter comprises forming a first pair of spaced parallel seals in said two sheets and forming a second pair of spaced parallel seals in said two sheets, said second pair of parallel seals intersecting said first pair of parallel seals.

4. A method of making an inflatable member in accordance with claim 1, comprising forming a tuck in one of said sheets of stretchable material prior to forming said seals.

5. An elongated inflatable member comprising two sheets of stretchable fluid impervious material sealed together at their peripheries, said sheets having different elastic characteristics sufficient to induce an arcuate shape in said member upon inducing an inflation stretch in each of said sheets, each of said sheets being substantially unstretched during sealing.

6. A tent-like structure having sides which taper to an apex, which sides comprise a plurality of elongated inflatable members in accordance with claim 5 in which gores are attached between pairs of said elongated inflatable members and said elongated inflatable members converge towards each other towards said apex.

7. A structure comprising a plurality of inflatable members in accordance with claim 5 in which the end portion of at least one of said inflatable members has a plurality of strap-like members attached thereto, which strap-like members have one mateable surface of a snap fastener attached thereto at their free ends.

8. Anchoring means for an inflatable structure comprising a wall portion having a plurality of apertures spaced along its periphery, a plurality of fastening elements attached to said wall portion and spaced along its periphery and means for attaching the wall portion to a support.

9. Anchoring means for an inflatable structure comprising a substantially cylindrical portion having a plurality of apertures spaced along its periphery, a plurality of fastening elements attached to said cylindrical portion and spaced along its periphery and a plurality of tabs depending from said anchoring means, said tabs being suitable for holding said anchoring means to a support.

10. Anchoring means for an inflatable structure comprising an elongated flat piece having two elongated leg members attached thereto, each of said leg members having a plurality of apertures spaced along its length, and a plurality of fastening elements attached to each of said leg members and spaced along its length.

11. A structure comprising a plurality of inflatable members in accordance with claim 5 in which the end portion of at least one of said inflatable members has a plurality of elongated members attached thereto, each of said elongated members having first fastening elements attached thereto at its free end, anchoring means comprising a wall portion of a design adapted to accommodate said inflatable member in its inflated condition, said wall portion having a plurality of apertures spaced along its periphery and a plurality of second fastening elements spaced along its periphery, said second fastening elements being of a design adapted to cooperate with said first fastening elements such that said elongated members can be inserted through said apertures in said wall portion and said first and second fastening elements brought into cooperation, and means for attaching the anchoring means to a support.

12. A structure comprising a plurality of inflatable members in accordance with claim 5 in which the end portion of at least one of said inflatable members has a plurality of elongated members attached thereto, each of said elongated members having first fastening elements attached thereto at its free end, anchoring means comprising an elongated flat piece having two elongated leg members attached thereto and forming a channel, each leg member having a plurality of apertures spaced along its length and a plurality of second fastening elements spaced along its length, said second fastening elements being of a design adapted to cooperate with said first fastening elements, whereby said elongated members attached to said inflatable member can be inserted through said apertures in said leg members and said first and second fastening elements brought into fastening cooperation.

13. An elongated inflatable member comprising two sheets of stretchable thermoplastic material sealed together along their peripheries, said sheets having different thicknesses sufficient to induce an arcuate shape in said member upon inducing an inflation stretch in each of said sheets, each of said sheets being substantially unstretched during sealing.

14. An inflatable structure comprising two sheets of stretchable fluid impervious material sealed together at their peripheries and by a series of spaced parallel seals, said sheets having different elastic characteristic sufficient to induce an arcuate shape in said structure upon inducing an inflation stretch in each of said sheets, each of said sheets being substanially unstretched during sealing.

15. An inflatable structure comprising two sheets of thermoplastic material sealed together at their peripheries and divided into a plurality of elongated substantially parallel inflatable tubular members by a plurality of spaced seals, said sheets having different thicknesses sufficient to induce an arcuate shape in said structure upon inducing an inflation stretch in each of said sheets, each of said sheets being substantially unstretched during sealing.

16. An inflatable structure in accordance with claim 15 having means for inflating each of said tubular members, means for entering and leaving said structure and means for anchoring said structure.

17. An inflatable structure in accordance with claim 16 in which said anchoring means comprises an elongated member having a hole therein through which a stake can be driven.

18. An inflatable structure in accordance with claim 15 in which the end portion of at least one of said inflatable members has a plurality of elongated members attached thereto, each of said elongated members having a fastening member thereon.

References Cited

UNITED STATES PATENTS

| 1,266,296 | 5/1918 | Mark | 46—87 |
| 2,591,829 | 4/1952 | Katzenmeyer | 52—2 |
| 2,651,314 | 9/1953 | Hasselquist | 52—2 |
| 2,743,510 | 5/1956 | Mauney | 52—2 |
| 3,059,656 | 10/1962 | Seubert | 52—2 |
| 3,091,454 | 5/1963 | Sam | 46—88 |

FOREIGN PATENTS 1,095,228  12/1954  France.

REINALDO P. MACHADO, *Primary Examiner.*